(12) United States Patent
Santini

(10) Patent No.: US 6,875,330 B2
(45) Date of Patent: Apr. 5, 2005

(54) PROCESS FOR COATING WORKPIECES WITH BEARING METAL

(75) Inventor: Marco Santini, Villingen-Schwenningen (DE)

(73) Assignee: Duralloy AG, Härkingen (CH)

(*) Notice: Subject to any disclaimer, the term of this patent is extended or adjusted under 35 U.S.C. 154(b) by 243 days.

(21) Appl. No.: 10/138,216

(22) Filed: May 2, 2002

(65) Prior Publication Data

US 2002/0162751 A1 Nov. 7, 2002

(30) Foreign Application Priority Data

May 3, 2001 (DE) .......................................... 101 21 593

(51) Int. Cl.[7] .............................. C25D 5/16; B32B 15/01
(52) U.S. Cl. ..................... 205/95; 205/109; 205/111; 205/205; 205/263; 205/271; 205/283; 205/319; 428/632; 428/634; 428/646; 428/666; 428/673; 428/680; 428/687; 428/936
(58) Field of Search ..................... 205/95, 109, 111, 205/205, 263, 271, 283, 319; 428/632, 634, 646, 666, 673, 680, 687, 936

(56) References Cited

U.S. PATENT DOCUMENTS 3,915,667 A 10/1975 Ricks
5,632,880 A 5/1997 Santini
6,355,366 B1 * 3/2002 Santini ....................... 205/205

FOREIGN PATENT DOCUMENTS

| DE | 25 02 284 A1 | 7/1975 |
| DE | 199 29 090 A1 | 12/2000 |
| EP | 0 217 126 B1 | 4/1987 |
| EP | 0 315 523 B1 | 5/1992 |
| EP | 0 761 844 A1 | 3/1997 |

* cited by examiner

Primary Examiner—Robert R. Koehler
(74) Attorney, Agent, or Firm—Akin Gump Strauss Hauer & Feld, LLP

(57) ABSTRACT

A process is provided for coating metallic workpieces with a bearing material, wherein the workpiece first receives a hard chromium plating having a pearl or columnar structure type surface. A predominantly silver layer is then galvanically deposited, which fills in and smooths the pearl or columnar structure type surface of the hard chromium plating. Optionally, additional hard chromium platings and predominantly silver-containing layers may be applied, preferably galvanically. The predominantly silver layer may advantageously contain a graphite component.

18 Claims, 3 Drawing Sheets

PROCESS FOR COATING WORKPIECES WITH BEARING METAL

BACKGROUND OF THE INVENTION

The invention is based on a process for coating metal workpieces with a bearing metal, wherein the workpiece is first cleaned, optionally activated, and then exposed to a galvanic chrome plating bath, to form a hard chrome plating with a hardness of at least about 600 HV (Vickers hardness scale) and having a pearl or columnar structure type, especially in accordance with German patent 25 02 284.

In this German patent a chrome plating bath is described with which glossy to metal gray chrome platings with a pearl or columnar structure type surface and having a hardness of up to about 1500 HV can be attained. These chrome platings with the trademark "Duralloy" are distinguished first by high wear resistance and second by favorable sliding or anti-friction properties, since the homogenous ball-type surface structure favors wettability and hence the formation of a stable oil film.

From European published patent application EP 0 761 844 A1 it has become known to fill in and smooth the pearl or columnar structure type surface of the hard chrome plating by galvanically applied black chromium. The black chromium is compressed in practical operation within a short time in a sort of breaking-in process, and the pearl structure is embedded. In this way, a mixed structure is obtained which, even without lubricants, has a high wear resistance with low friction values.

BRIEF SUMMARY OF THE INVENTION

Proceeding from this background, underlying the present invention is the objective of providing an alternative coating of the hard chrome plating, which is distinguished by particular corrosion resistance, while preserving favorable sliding or anti-friction properties during high running times, and is consequently specially suited for use in the chemical industry.

This objective is accomplished in accordance with the invention in that the galvanically applied layer comprises at least predominantly silver.

It has surprisingly been shown that silver, which is not really a bearing metal, in combination with the pearl or columnar structure type hard chromium undercoating has, on the one hand, very good sliding or anti-friction properties, especially emergency running properties. On the other hand, it forms, probably on the basis of its noble metal character, a quasi barrier layer for the hard chromium undercoating and protects the latter from corrosion, and indeed even against chemically aggressive media. Unexpectedly, this corrosion protection even applies for the hard chromium islands, which emerge through the silver coating following the breaking-in process, so that the coating of the invention is also best suited for chemically aggressive uses. Studies by the applicant in relation to this suggest the conclusion that the silver layer absorbs additives from the lubricant during the breaking-in process, and thereby forms a mixed structure which, following the partial erosion of the silver layer and the exposure of hard chromium islands, also brings about a corrosion protection for the latter.

It is indeed already known from German Patent DE 199 29 090 how to apply on a pearl or columnar structure type surface a plating based on a molybdenum sulfide, and thereby improve the sliding or anti-friction properties. However, the person skilled in the art could not infer therefrom any suggestion of replacing the molybdenum sulfide layer by a silver layer. Apart from this, the molybdenum sulfide layer is not electrochemically applied, as is the case with the present silver layer.

With regard to the silver layer to be deposited, it is recommended that it comprise at least primarily non-oxidized pure metal. Nevertheless, it lies entirely within the scope of the invention to select special silver compounds or to combine silver with other suitable materials. In particular, it can be expedient for producing low static friction coefficients if the silver layer has a graphite component, approximately on the order of magnitude from 10 to 30%. The graphite is here introduced into the galvanizing bath and is deposited with the silver on the hard chromium underlayer.

The thickness of the silver layer is preferably adapted to the subsequent use conditions of the workpiece. For high relative speeds between parts sliding on one another, especially if a hydrodynamic lubricating slot is formed therein, it is recommended that the silver layer be deposited at a thickness of about $0.05\mu$ to about $3\mu$, and preferably about $0.1\mu$ to about $0.3\mu$, in relation to the peaks of the pearl or columnar structure type hard chromium plating. In contrast, if only low relative speeds occur, for example in connection with back and forth swiveling motions, where no hydrodynamic lubricant film forms, then a thickness of about $3\mu$ to about $25\mu$, here also in relation to the peaks of the pearl or columnar structure type hard chromium plating, is recommended.

According to one embodiment of the invention, it is recommended that the silver layer not be directly applied to the hard chromium surface, but instead to provide in between a nickel layer as an adhesion mediator. The nickel layer can likewise be applied galvanically. Thereafter, the workpiece is rinsed and immersed in the galvanizing bath for applying the silver layer. The thickness of the nickel layer expediently lies in a range of about $0.1\mu$ to about $1\mu$.

The thickness of the hard chromium plating in relation to the peaks of the pearl or columnar structure type surface is expediently selected to be at least about $1.5\mu$, preferably about $2\mu$ to about $8\mu$.

Finally, a further interesting embodiment of the invention consists in that an additional layer of another metal is galvanically deposited upon the silver layer. This can be recommendable in cases where a long service life and/or a better corrosion protection is needed. Then, a further chromium layer can be deposited on the silver layer, again especially in the form of a pearl or columnar structure type hard chromium plating, and optionally a further silver layer.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
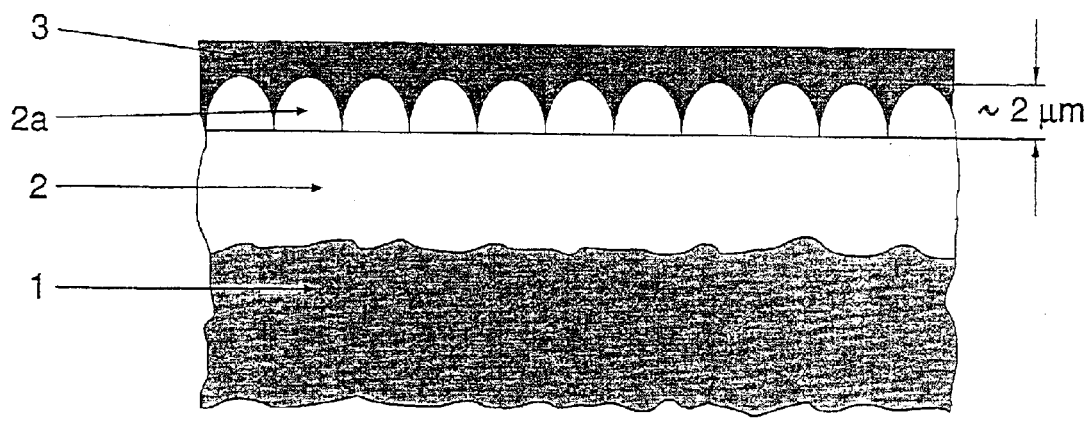
FIG. 1 is a cross sectional view through a workpiece after applying the hard chromium and the silver layers.

Proceeding from a metallic workpiece 1, which is first thermally (at a maximum of 70° C.) and electrolytically degreased and then converted from a basic to an acidic condition by a 5% sulfuric acid pickling bath, in order to activate it for the subsequent galvanic treatment. Then, the workpiece is immersed in a chrome plating bath which contains 400 to 500 g/l of chromium trioxide, 2 to 14 g/l of strontium sulfate, 4 to 26 g/l of potassium silicofluoride, 2 to 8 g/l of potassium dichromate, and 4 to 50 g/l of technical 2,2-dichloromalonic acid. Here and with respect to the remaining treatment parameters, reference is made to the above-mentioned German Patent 25 02 284.

The workpiece 1 thereby obtains a hard chromium plating 2 with a layer thickness of at least about $1.5\mu$, preferably about 4 to about $6\mu$. The bath parameters are adjusted such that a more or less uniform pearl structure 2a with a rough depth of at least about $1\mu$, preferably about $1.5\mu$ to about $5\mu$, appears on the surface of the hard chromium plating.

After this treatment the workpiece is rinsed, in order to remove the residue of the chrome bath, and the workpiece is thereafter immersed in a second galvanic bath, in order to deposit a silver layer 3 on the pearl structure. In particular, Scania® of the Heraeus company is suitable as an electrolyte fluid. The bath temperature is room (ambient) temperature, the current density is 0.05–0.8 amp/dm², and the voltage is 0.3–2.7 volts.

Figure 2:
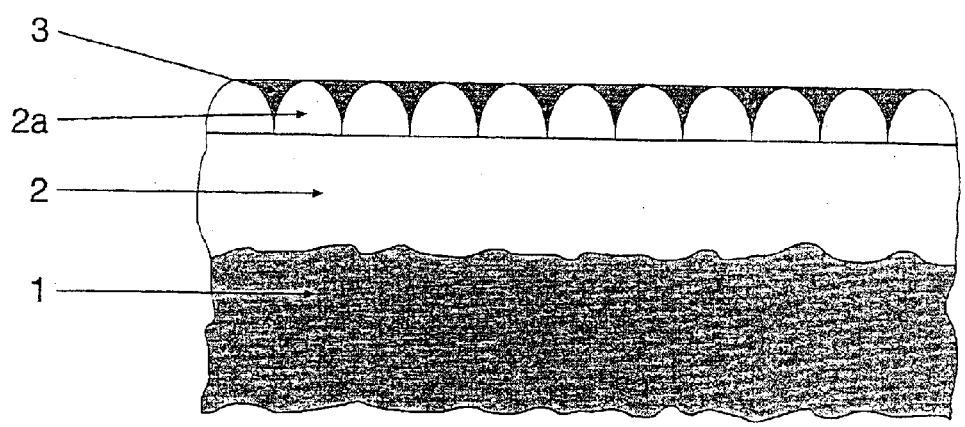
FIG. 2 is a cross sectional view as in FIG. 1, after breaking-in the work piece.

Following a treatment period on the order of magnitude of several minutes, a silver layer of about $0.5\mu$ to $30\mu$ forms on the hard chromium layer. The layer thickness is selected such that the pearl structure 2a of the hard chromium plating is at least filled in and leveled, and expediently also receives a certain covering, as represented in FIG. 1. This covering is worn off after a short breaking-in phase, owing to the low wear resistance of silver, and is compressed into the pearl structure, whereupon the surface structure represented in FIG. 2 results. It is characterized by a continuous silver phase, which is penetrated by a plurality of hard chromium islands. It has no pores or cracks.

Figure 4:
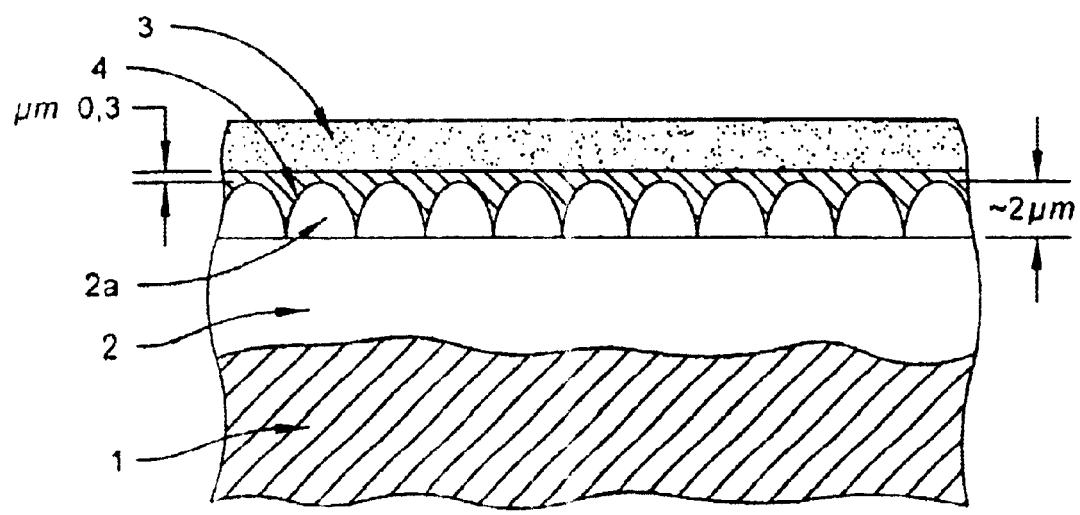
FIG. 4 is a cross sectional view through another embodiment of a workpiece with a nickel adhesion layer.

In order to improve the adhesion of the silver layer 3, a nickel layer 4 of about $0.1\mu$ to $0.5\mu$ thickness can be galvanically deposited on the pearl structure prior to applying the silver layer, as shown in FIG. 4.

Figure 3:
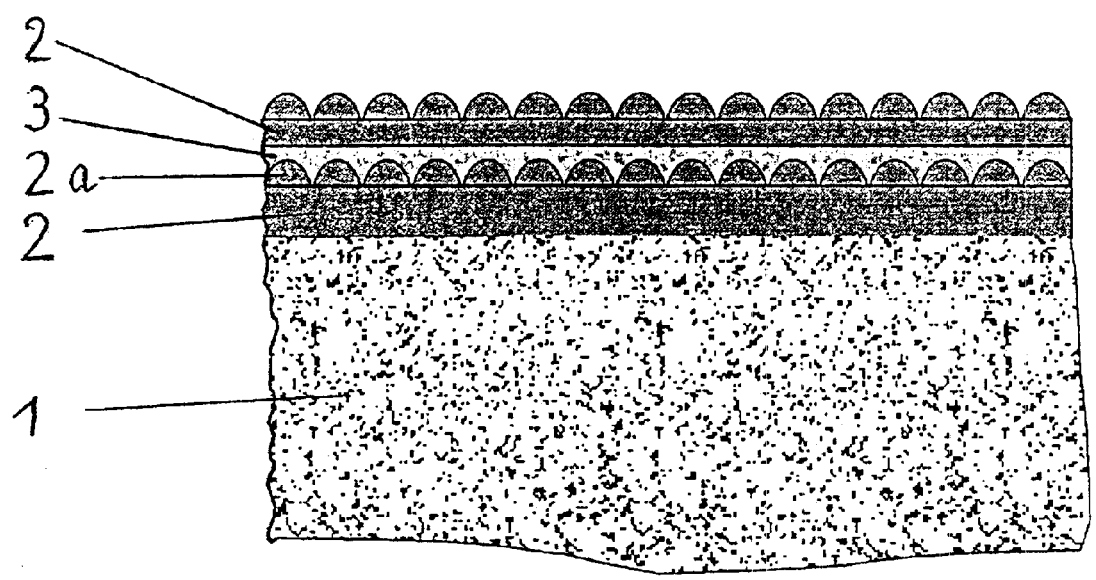
FIG. 3 is a cross sectional view through a workpiece with several hard chromium and silver layers.
Figure 5:
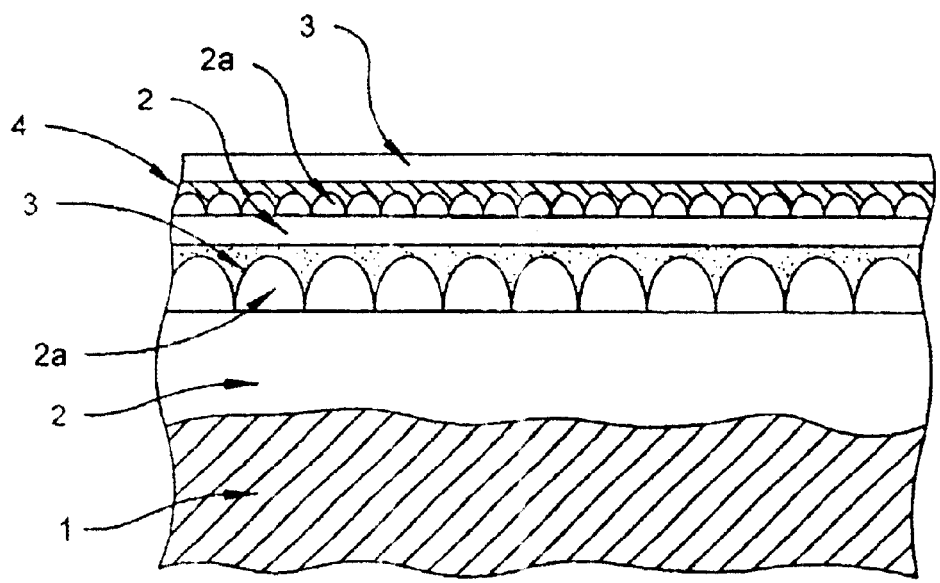
FIG. 5 is a cross sectional view through another embodiment of a workpiece with a predominantly silver layer deposited on an additional layer.

In the event that particularly high requirements are imposed for the corrosion resistance of the coating, a multi-layer coating of several hard chromium pearl structure layers can be generated in accordance with FIG. 3, wherein it is indeed expedient, but not absolutely necessary, to use a silver layer 3 as the outermost layer. Such a multi-layer coating, as shown in FIG. 5, can be effective with very thin, pearl structure, hard chromium layers, which have the advantage that they are absolutely free of cracks. Their deficient corrosion resistance is compensated for by the multiple layer character.

The coated workpieces of the invention come into consideration for all bearing constructions, be they roller bearings, sliding bearings, linear guides, slide mountings and the like, but also for transmissions, gears and other friction-stressed machine elements.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A process for coating a metallic workpiece with a bearing material, comprising cleaning the workpiece, optionally activating the workpiece, then exposing the workpiece to a galvanic chrome plating bath to form on the workpiece a hard chromium plating having a hardness of at least about 600 HV and a pearl or columnar structure type surface, and filling in and smoothing the pearl or columnar structure type surface with a galvanically applied layer, wherein the galvanically applied layer comprises at least predominantly silver.

2. The process according to claim 1, wherein the galvanically applied layer comprises predominantly non-oxidized pure metal.

3. The process according to claim 1, wherein the galvanically applied layer has a graphite component.

4. The process according to claim 3, wherein graphite component comprises about 10% to about 30% of the galvanically applied layer.

5. The process according to claim 3, wherein the galvanically applied layer is deposited in a graphite-containing galvanic bath.

6. The process according to claim 1, wherein the galvanically applied layer is deposited at a thickness of at least about $0.05\mu$ relative to peaks of the pearl or columnar structure type surface, for use in bearings subject to high relative surface speeds.

7. The process according to claim 6, wherein the galvanically applied layer is deposited at a thickness of about $0.1\mu$ to about $3\mu$.

8. The process according to claim 1, wherein the galvanically applied layer is deposited at a thickness of about $3\mu$ to about $25\mu$ relative to peaks of the pearl or columnar structure type surface, for use in bearings subject to low relative surface speeds.

9. The process according to claim 1, further comprising applying a nickel layer as an adhesion mediator between the pearl or columnar structure type surface and the galvanically applied layer.

10. The process according to claim 9, wherein the nickel layer is galvanically applied.

11. The process according to claim 9, wherein the nickel layer has a thickness of about $0.1\mu$ to about $1\mu$.

12. The process according to claim 1, wherein the hard chromium plating has a layer thickness of at least about $1.5\mu$ relative to peaks of the pearl or columnar structure type surface.

13. The process according to claim 12, wherein the hard chromium plating has a layer thickness of about $2\mu$ to about $8\mu$.

14. The process according to claim 1, further comprising applying an additional layer to the galvanically applied layer.

15. The process according to claim 14, wherein the additional layer is a metal layer.

16. The process according to claim 14, wherein the additional layer is another hard chromium plating having a pearl or columnar structure type surface.

17. The process according to claim 16, further comprising depositing a predominantly silver layer on the additional layer.

18. A workpiece produced according to the process of claim 1.

* * * * *